US010808955B2

(12) United States Patent
Tripathii

(10) Patent No.: US 10,808,955 B2
(45) Date of Patent: Oct. 20, 2020

(54) ENVIRONMENTALLY EFFICIENT SMART HOME AIR-QUALITY NETWORK SYSTEM

(71) Applicant: Eeshan Tripathii, Montclair, NJ (US)

(72) Inventor: Eeshan Tripathii, Montclair, NJ (US)

(*) Notice: Subject to any disclaimer, the term of this patent is extended or adjusted under 35 U.S.C. 154(b) by 7 days.

(21) Appl. No.: 15/922,831

(22) Filed: Mar. 15, 2018

(65) Prior Publication Data

US 2019/0285295 A1   Sep. 19, 2019
US 2020/0278125 A9   Sep. 3, 2020

Related U.S. Application Data

(60) Provisional application No. 62/472,506, filed on Mar. 16, 2017.

(51) Int. Cl.
| | |
|---|---|
| *F24F 11/00* | (2018.01) |
| *F24F 7/007* | (2006.01) |
| *F24F 11/30* | (2018.01) |
| *F24F 11/65* | (2018.01) |
| *F24F 11/56* | (2018.01) |
| *F24F 110/52* | (2018.01) |

(52) U.S. Cl.
CPC .......... *F24F 11/0001* (2013.01); *F24F 7/007* (2013.01); *F24F 11/30* (2018.01); *F24F 11/56* (2018.01); *F24F 11/65* (2018.01); *F24F 2011/0002* (2013.01); *F24F 2110/52* (2018.01)

(58) Field of Classification Search
CPC ......... F24F 11/0001; F24F 11/30; F24F 11/65
See application file for complete search history.

(56) References Cited

U.S. PATENT DOCUMENTS

| | | | | |
|---|---|---|---|---|
| 5,408,837 | A | * | 4/1995 | Omura ...................... F24F 11/00 62/89 |
| 8,986,427 | B2 | * | 3/2015 | Hauville ................ B01D 46/44 95/8 |
| 2002/0081964 | A1 | * | 6/2002 | Chou ....................... F24F 11/30 454/233 |
| 2003/0051023 | A1 | * | 3/2003 | Reichel .............. G01N 33/0075 709/223 |
| 2006/0173579 | A1 | * | 8/2006 | Desrochers .............. G01N 1/26 700/276 |
| 2006/0234621 | A1 | * | 10/2006 | Desrochers ............. F24F 3/044 454/239 |
| 2007/0084938 | A1 | * | 4/2007 | Liu ........................ B64D 13/06 236/91 D |
| 2007/0181000 | A1 | * | 8/2007 | Wilson .................... A61L 9/014 96/134 |
| 2007/0227721 | A1 | * | 10/2007 | Springer ............ G05D 23/1931 165/291 |

(Continued)

*Primary Examiner* — Vincent H Tran
(74) *Attorney, Agent, or Firm* — Rangarajan Sourirajan; Rajan Law Office, LLC

(57) ABSTRACT

An air-quality network system for homes, the air-quality network system having an air inlet unit, an air outlet unit, and a monitoring unit. The monitoring unit monitors, measures, and transmits information regarding the air quality to a network. The data management algorithm in the network compares the air quality information against preset/user-defined values and accordingly, determines the operating parameters of the air inlet and/or air outlet units. The system provides real-time monitoring and visualization of the air quality in the home, and provides emergency alerts if air quality exceeds safety limits.

12 Claims, 11 Drawing Sheets

(56) References Cited

U.S. PATENT DOCUMENTS

| | | | |
|---|---|---|---|
| 2009/0012650 A1* | 1/2009 | Wang | F24F 11/30 700/276 |
| 2009/0013703 A1* | 1/2009 | Werner | F24F 5/0046 62/180 |
| 2010/0198411 A1* | 8/2010 | Wolfson | G05B 15/02 700/275 |
| 2011/0184566 A1* | 7/2011 | Steiger | F24F 11/30 700/278 |
| 2014/0166765 A1* | 6/2014 | Takahashi | F24F 3/1405 236/44 A |
| 2014/0206278 A1* | 7/2014 | Stevenson | F24F 11/76 454/343 |
| 2015/0009030 A1* | 1/2015 | Shih | A01G 7/00 340/540 |
| 2015/0011154 A1* | 1/2015 | Holm | F24F 7/007 454/258 |
| 2015/0052975 A1* | 2/2015 | Martin | G01N 33/00 73/31.02 |
| 2015/0156031 A1* | 6/2015 | Fadell | H04L 12/2816 700/276 |
| 2015/0300677 A1* | 10/2015 | Wang | E06B 7/02 96/384 |
| 2015/0310720 A1* | 10/2015 | Gettings | G06F 16/113 340/540 |
| 2015/0323427 A1* | 11/2015 | Sharp | G01N 1/2273 73/863.23 |
| 2016/0066068 A1* | 3/2016 | Schultz | H04Q 9/00 340/870.07 |
| 2016/0116177 A1* | 4/2016 | Sikora | F24F 11/30 165/11.2 |
| 2017/0094839 A1* | 3/2017 | Wu | H05K 7/20836 |
| 2017/0130981 A1* | 5/2017 | Willette | F24F 3/16 |
| 2017/0139386 A1* | 5/2017 | Pillai | A61M 21/02 |
| 2017/0205089 A1* | 7/2017 | Fukuhara | F24F 11/89 |
| 2018/0071918 A1* | 3/2018 | Angle | H04W 4/029 |
| 2018/0073759 A1* | 3/2018 | Zhang | G01N 33/0075 |
| 2018/0299159 A1* | 10/2018 | Ajax | F24F 11/46 |
| 2018/0330811 A1* | 11/2018 | Macary | G06Q 10/0639 |
| 2018/0340701 A1* | 11/2018 | Baughman | F24F 11/30 |

\* cited by examiner

ENVIRONMENTALLY EFFICIENT SMART HOME AIR-QUALITY NETWORK SYSTEM

CROSS REFERENCE TO RELATED APPLICATIONS

This U.S. non-provisional patent application claims the benefit of U.S. Provisional Application No. 62/472,506 titled "Environmentally Efficient Smart Home Air-Quality Network: A Modular Ductless System for Improving Indoor Air Quality by Continuous Detection and Automated Ventilation Controlled by Smart Algorithm," filed on Mar. 16, 2017, the disclosure of which is hereby incorporated by reference in its entirety.

BACKGROUND OF THE INVENTION

The inventive concepts relate to the field of air filtration and ventilation system and, in particular, to an air-quality network system. More particularly, the inventive concepts relate to an air-quality network system for environmentally efficient smart homes and/or smart buildings.

Indoor Air Quality (IAQ), is one of the most influential factors in human health. Poor indoor air quality can lead to development of infections, chronic lung diseases such as asthma, and lung cancer. Every year, four million people die painful deaths from indoor air pollution. Indoor air pollutant levels can be 3-5 times, and occasionally, more than 100 times higher than outdoor levels. The indoor air pollutants concentration is particularly concerning because most people in the U.S. spend about 90% of their time indoors.

A number of conditions contribute to typically higher levels of indoor pollutants than corresponding levels outdoors. Problems associated with indoor air pollution have developed a new dimension due to new energy-efficient measures such as tightly constructed buildings, increased insulation, and reduced ventilation. Tightly constructed buildings, for instance, reduce the amount of available fresh air for dilution and for purging out of pollutants, which in turn builds up high level of toxic substances indoors.

The poor indoor air quality creates a serious health risk to inhabitants as human sensory organs are incapable of recognizing the presence of indoor air pollutants. This risk is especially acute for young children, pregnant women, elderly, and people with poor immune systems.

Air pollution levels, temperature, humidity, and other factors change constantly inside a home or building. This necessitates that the solution to solving indoor air quality be responsive to changing data. Additionally, low-income homes and buildings that lack a centralized HVAC system need a ventilation system to provide clean air for occupants inside such homes and/or buildings.

Therefore, the need exists for a system that monitors indoor air quality in real-time and detects poor IAQ, an energy efficient management of indoor air quality, a real-time warning of abnormal indoor air quality, and a modular design allowing easy customization, installation and maintenance of parts. There is a further need for a system that will be responsive to internal and external environmental conditions such as temperature, humidity, pressure and presence of particulate matter, VOC's, and other determinants of air quality.

SUMMARY OF THE INVENTION

The inventive concepts overcome the disadvantages of the prior art and fulfills the needs noted above by providing an air-quality network system. Embodiments of the inventive concepts may provide a ductless, modular and smart system for improving indoor air quality in real-time.

An inventive concept includes an air-quality network system, the air-quality network system having a plurality of air inlet units, a plurality of air outlet units, and a plurality of monitoring units. It further includes a plurality of user devices and a network. The plurality of air inlet units, the plurality of air outlet units, the plurality of monitoring units, and the plurality of user devices may be communicatively linked to the network.

The plurality of air inlet units may have a controller unit, a modular heating unit, a core module with a fan and a main filter, a modular chamber, a pre-filter, a modular UV light unit, an external ring, and a housing unit. The controller unit preferably has a microcomputer, microcontroller or microprocessor, and a wireless receiver unit such as nRF24L01. The controller unit may have sensors to measure atmospheric pressure, temperature, and/or other air quality parameters. The microprocessor may be, for example, Intel Edison, Raspberry PI, or Arduino. Wireless receiver unit will be similar to nRF24L01, is a single chip 2.4 GHz transceiver with an embedded baseband protocol engine designed for ultra low power wireless applications.

The modular heating unit has a top end and a bottom end, and contains a heating element. The temperature sensor in the controller unit controls the operation of the modular heating unit. Based on the reading of the temperature sensor of the controller unit, the microprocessor in the controller unit determines the time for which the heating element in the modular heating unit must be operational so the incoming air from outside the home can be heated to match the temperature of the air inside the home. The controller unit is threadedly engaged to the top end of the modular heating unit and electrically wired to the heating element.

The main filter is preferably a High Efficiency Particulate Air (HEPA) filter. The main filter and the fan are securely engaged to the bottom end of the modular heating unit and to a top end of the modular chamber. The pre-filter is securely engaged to a bottom end of the modular chamber. An external ring is securely attached to the pollen proof net and a housing unit may be used as an external cover for acoustic control. The pre-filter is preferably a carbon filter in combination with a pollen proof net.

A filter check gauge is removably positioned proximate the air inlet unit for providing an indication of air flow volume and thereby, the need to replace either the pre-filter or the filter. The modular UV light unit may be used to sanitize the air entering the home by treating the air with UV to kill microbial particles that may be present in the air. It must be understood that the air outlet unit is substantially the same as the air inlet unit.

The monitoring unit preferably has a plurality of microcomputers or microprocessors, a plurality of wireless transmitter units, a plurality of sensor boards, and a plurality of sensors to measure atmospheric pressure, temperature, humidity, and/or other air quality parameters including, but not limited to, VOC, $CO_2$, CO, PM2.5. The plurality of sensors for measuring particulate matter (PM) and volatile organic compounds (VOC) data may be, for example, Shinyei PPD42NS, Grove MQ5, MQ7, MQ135 and Figaro TGS2600. The monitoring unit can be plugged into any standard power outlet for power source or can be powered by batteries, or other sources of power.

The monitoring unit may have other add-on modules including, but not limited to, motion sensor unit, Wi-Fi speaker, and LED light. These add-on modules may be used in any combination to constitute the monitoring unit.

An inventive concept also includes placing the air inlet unit and the air outlet unit within a preferably sturdy and airtight casing designed to fit most of the windows. The air inlet unit may be placed together with the monitoring unit on the window sill of a given window and securely engaged by the weight of the window pane. The air outlet unit may be placed in a different window on the window sill and securely engaged by the weight of the window pane.

Another inventive concept includes placing the monitoring unit together with the air inlet unit and air outlet unit within the same window. The bottom and top part of the window unit may be designed with slots/grooves to enable convenient placement of the air inlet unit, the air outlet unit, and/or the monitoring unit within various types of windows such as single and double hung.

An inventive concept also includes a method of managing the air quality of a home using the air-quality network system. The method includes the steps of measuring values of a plurality of air-quality parameters in the home using a plurality of monitoring units; transmitting the measured values of the plurality of air-quality parameters to a remote data management application; comparing the measured values of the plurality of air-quality parameters against pre-determined values or user-defined values; and determining a response based on pre-determined or user-defined threshold.

The step of determining the response further includes the step of checking air quality conditions external to the home; and determining operation of a plurality of air inlet units and/or a plurality of air outlet units for a pre-determined or user-defined period of time, or based on a computer algorithm. The sensor units determine the concentration of the air-quality parameters and based on the concentration of the pollutants, the algorithm calculates the "half-life". The "half-life" is defined as the time estimated to reduce the concentration of the pollutant by half and is based on modeling pollutant behavior similar to first order decay. Alternatively, the step of determining the operation of the plurality of air inlet units and/or the plurality of air outlet units is at a programmable rate that is regulated by the user. In another inventive concept, when the sensor unit sends the contamination level information to the controller unit, the controller unit will reach an intelligent decision to run ventilation operation for "T" minutes. An embedded microprocessor transforms the received signal into a corresponding control signal and determines the dynamic run time. This "T" minutes time frame is initially based on stochastic analysis based on a hypothetical average room and external environmental conditions. The run-time "T" changes dynamically with the changes in the exposure.

The method may include additional steps of providing analytic and interactive visualization capabilities on a plurality of user devices to aid the user; allowing the user to remotely monitor and/or control the air quality by managing the operations of the plurality of the air inlet units, the plurality of the air outlet units, and the plurality of the monitoring units; displaying current air-quality parameters. The method may include additional step of providing emergency alert messages regarding high indoor toxicity.

The inventive concept also includes a system for implementing the above methods in a computer system. In this system, the computer comprises a computer-readable storage medium in which the software implementing the above methods are stored and executed. The system includes, among others, a network controller that is communicatively linked to a network such as a Local Area Network (LAN), Wide Area Network (WAN), Internet, or the like.

Further, the inventive concept includes a system for implementing the above methods using a cloud computing architecture. The software implementing the methods is stored in an application server in the cloud, and a plurality of user devices and plurality of air inlet, air outlet and monitoring units are communicatively linked to the cloud.

Other features and advantages of the inventive concepts will become apparent from the following description of the invention, which refers to the accompanying drawings.

DETAILED DESCRIPTION OF THE PREFERRED EMBODIMENTS

Disclosed embodiments relate to an air-quality network system for improving indoor air quality and a method of using the same.

The terminology used herein is for the purpose of describing particular embodiments only and is not intended to limit the invention. As used herein, the singular terms "a," "an," and "the" are intended to include the plural forms as well, unless the context clearly indicates otherwise.

The term "mobile device" also referred to as a handheld device, or handheld is intended to include any computing device that may be held in a hand. These devices include, but not limited to, personal digital assistants (PDA); smartphones such as Apple's iPhone, Samsung's Droid and Blackberry Storm; tablet computers such as Apple's iPad, Motorola's Xoom, BlackBerry PlayBook and Samsung's Galaxy Tab; mobile internet device (MID) such as Lenovo's Ideapad, and Nokia's N810; and cellular phones.

The term "cloud computing" is defined as a model for enabling convenient, on-demand network access to a shared pool of configurable computing resources (such as networks, servers, storage, applications, and services) that can be rapidly provisioned and released with minimal management effort or service provider interaction. Also, any system providing access via the Internet to processing power, storage, software or other computing services, often via a web browser.

The term "computer-readable storage medium" or "computer-readable storage media" is intended to include any medium or media capable of storing data in a machine-readable format that can be accessed by a sensing device and capable of converting the data into binary format. Examples include, but not limited to, floppy disk, hard drive, zip disk, tape drive, CD-ROM, CD-R, CD-RW, DVD-ROM, DVD-RW, blu-ray disc, USB flash drive, RAM, ROM, solid state drive, memory stick, multimedia card, CompactFlash, holographic data storage devices, minidisc, semiconductor memory or storage device, or the like.

Figure 1:
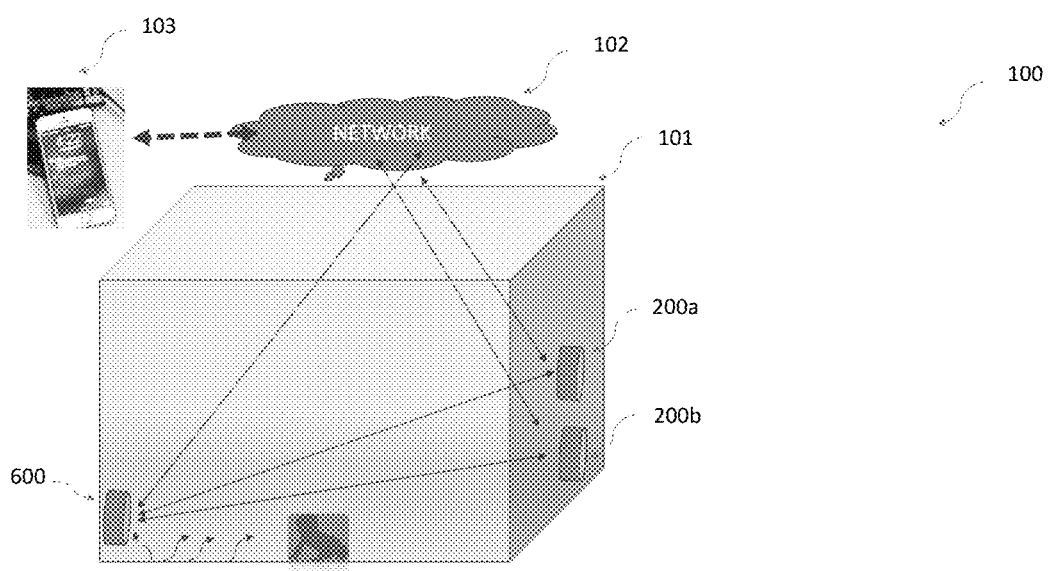
FIG. 1 illustrates a schematic diagram of an air-quality network system in accordance with an embodiment of the inventive concepts.

Referring now to the drawings, where like elements are designated by like reference numerals, FIG. 1 illustrates an air-quality network system 100 in accordance with an embodiment. A home 101 may have an air-quality network system 100 having a plurality of air inlet units 200a, a plurality of air outlet units 200b, and a plurality of monitoring units 600. The plurality of air inlet units 200a, the plurality of air outlet units 200b, the plurality of monitoring units 600, and a plurality of user devices 103 may be communicatively linked to network 102.

The network 102 may be a private cloud, community cloud, combined cloud, hybrid cloud, or any other cloud model. The cloud may have services such as Software as a Service (SaaS), which eliminates the need to install and run an application on a client machine; Platform as a Service (PaaS), which facilitates a computing platform in the cloud; and Infrastructure as a Service (IaaS), which delivers computer infrastructure such as servers, storage and network equipment on the cloud.

Alternatively, the network 102 may be a Local Area Network (LAN), Wide Area Network (WAN), Internet, an intranet system, an extranet system, or the like. The network 102 may have one of several topologies including, but not limited to, point-to-point, bus, star, ring, tree, mesh and hybrid. The plurality of user devices 103, monitoring units 600, air inlet units 200a, air outlet units 200b, and the network 102 may be communicatively linked using 100Base-T Ethernet, digital subscriber line (DSL), integrated service digital network (ISDN), DS lines, dedicated T1/T3 lines, fiber-optic cables, satellite dish, wireless, or the like.

The plurality of clients 103 may be mobile devices, or a personal computer such as a desktop computer, a workstation, a laptop, a netbook, a nettop, or the like. The plurality of user devices 103 may be a thick client providing rich functionality independent of a server or a thin client that depends heavily on a server for computational needs. Each of the user devices may have applications such as a virtual private network (VPN) that enables secure connection of a remote user to LAN, or a web browser such as Internet Explorer®, Firefox®, Safari, Chrome, or the like to connect to the Internet.

Figure 2A:
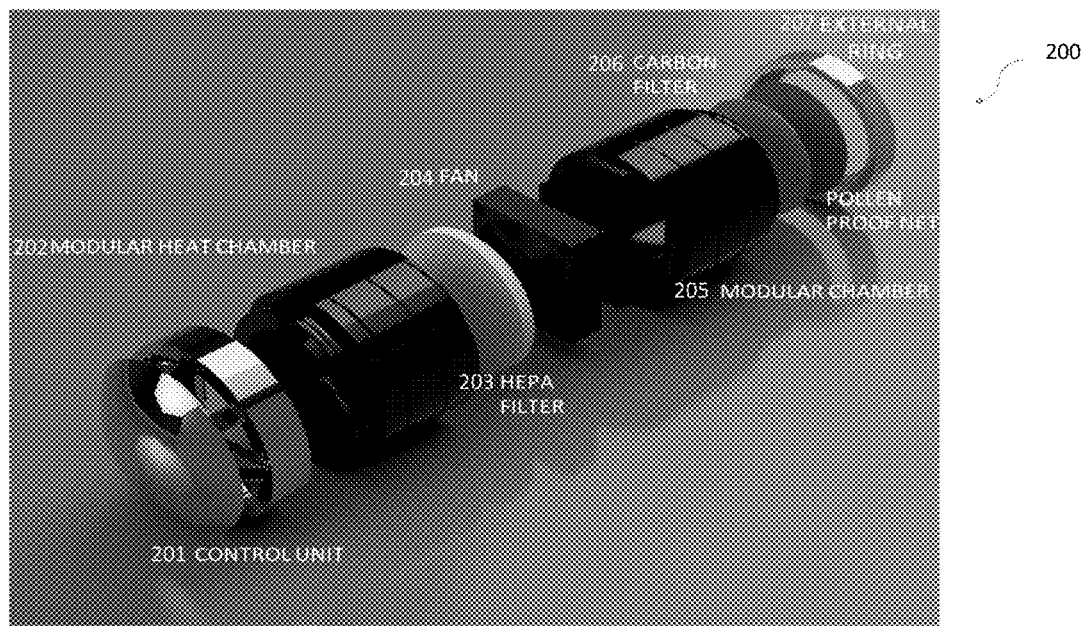
FIG. 2A illustrates a schematic diagram of various modular units of an air inlet and air outlet unit of the air-quality network system in accordance with an embodiment of the inventive concepts.
Figure 2B:
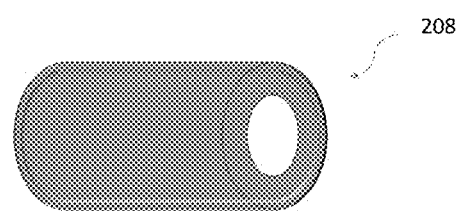
FIG. 2B illustrates a schematic diagram of a modular casing to enclose various modular units of an air inlet and air outlet unit of the air-quality network system in accordance with an embodiment of the inventive concepts.

Referring to FIG. 2A-2B, an air inlet unit 200a may have a controller unit 201, a modular heating unit 202, a core module with a fan 204 and a main filter 203, a modular chamber 205, a pre-filter 206, a modular UV light unit (not shown), an external ring 207, and a housing unit 208. The controller unit 201 preferably has a plurality of microcomputers, microcontrollers or microprocessors, and a plurality of wireless receiver units. The controller unit 201 may have sensors to measure atmospheric pressure, temperature, and/or other air quality parameters. The plurality of microprocessors may be, for example, Intel Edison, Raspberry PI, or Arduino. The plurality of wireless receiver units may be, for example, nRF24L01.

TABLE 1

Air Inlet Unit of the Inventive Concept

| | |
|---|---|
| Controller Unit | |
| Overall dimensions: | Substantially cylindrical, radius 2", height of 1", thickness 0.5" |
| Basic shape: | Shape as shown in FIGS. 2A-2B |
| Components: | Microprocessor (Intel Edison, Raspberry PI, or Arduino), wireless receiver unit (nRF24L01), sensors (Shinyei PPD42NS, Grove MQ5, MQ7, MQ135 and Figaro TGS2600) |
| Modular Heating Unit | |
| Overall dimensions: | Substantially cylindrical, radius 2.5", height 1", thickness 0.5" |
| Basic shape: | Shape as shown in FIGS. 2A-2B |
| Material: | PVC, 3D printed, Cast acrylic and Extruded acrylic or other suitable insulating material for outer casing and attachment parts |
| Components: | Heating element (preferably, coiled nichrome wire wrapped around insulating mica boards or similar materials) |
| Core Module | |
| Overall dimensions: | 2.5" (radius) × 5.5" (height) |
| Basic shape: | Shape as shown in FIGS. 2A-2B |
| Components: | Fan (AC Infinity AXIAL 1751, Muffin Fan, 115 V 120 V AC 172 mm × 150 mm × 51 mm High Speed), HEPA filter (High efficiency filters with multiple filtration layers for maximum filtration and allergy protection) |
| Modular Chamber | |
| Overall dimensions: | 2.6" (radius) × 0.2" (thickness) × 5.5" (height) |
| Basic shape: | Shape as shown in FIGS. 2A-2B |

TABLE 1-continued

Air Inlet Unit of the Inventive Concept

| | |
|---|---|
| Components: | Modular heat chamber, HEPA filter, Fan, Carbon Filter, Pollen proof net, External ring |
| Material: | PVC, 3D printed, Cast acrylic and Extruded acrylic or other suitable insulating material |

Modular UV Light Unit

| | |
|---|---|
| Overall dimensions: | 2" (length) × 0.18" (width) × 0.71" (height) |
| Material: | Glass; 3.5 W UV bulb |

External Ring

| | |
|---|---|
| Overall dimensions: | 2.6" (radius) × 0.5" (width) × 0.2" (thickness) |
| Basic shape: | Shape as shown in FIGS. 2A-2B |
| Material: | Steel or other suitable metal |

Monitoring Unit

Figure 3:
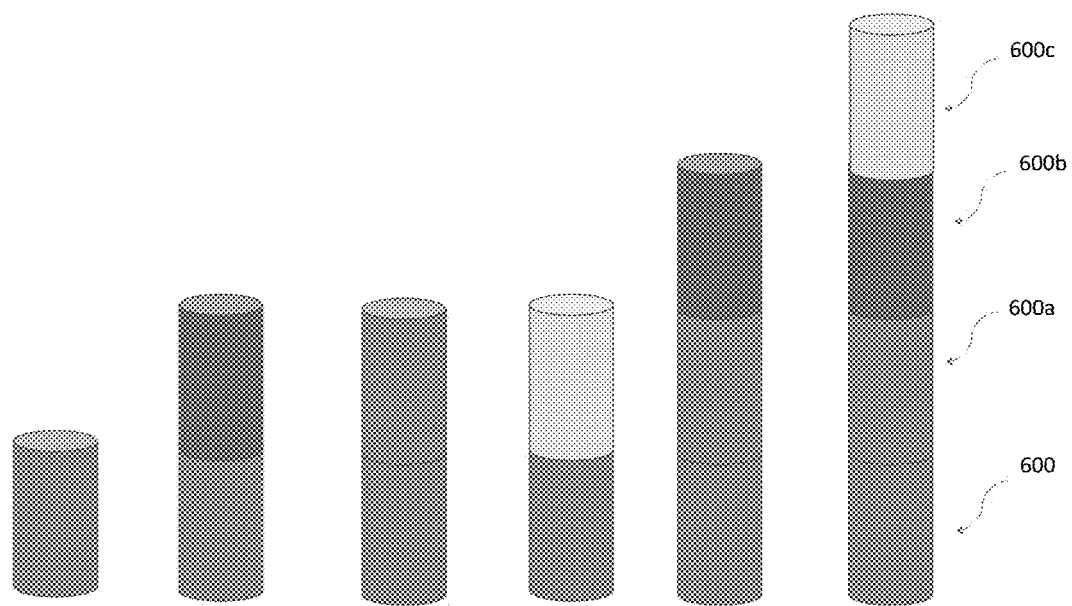
FIG. 3 illustrates a schematic diagram of the monitoring unit of the air-quality network system in accordance with an embodiment of the inventive concepts.

| | |
|---|---|
| Overall dimensions: | substantially cylindrical, 2.5" (radius) × 3" (height) |
| Basic shape: | Shape as shown in FIG. 3 |
| Components: | Microprocessor (Intel Edison, Raspberry PI, or Arduino), wireless transmitter unit (nRF24L01), sensors (Shinyei PPD42NS, Grove MQ5, MQ7, MQ135 and Figaro TGS2600) |

The modular heating unit 202 has a top end and a bottom end, and contains a heating element, for example, made of coiled nichrome wire. The temperature sensor in the controller unit 201 controls the operation of the modular heating unit 202. Based on the reading of the temperature sensor of the controller unit 201, the microprocessor in the controller unit 201 determines the time for which the heating element in the modular heating unit 202 must be operational so the incoming air from outside the home can be heated to match the temperature of the air inside the home. The controller unit 201 is threadedly engaged to the top end of the modular heating element 202.

The main filter 203 is preferably a High Efficiency Particulate Air (HEPA) filter, for example, high efficiency filters with multiple filtration layers for maximum filtration and allergy protection. The main filter 203 and the fan 204 are securely engaged to the bottom end of the modular heating unit 202 and to a top end of the modular chamber 205. The modular chamber 205 is preferably made of PVC, plastic casing, 3D printing, or the like. The pre-filter 206 is securely engaged to a bottom end of the modular chamber 205. An external ring 207 is securely attached to the pollen proof net and a housing unit 208 may be used as an external cover for acoustic control. The modular chamber 205 may have a servo motor that operates to open or close the air passage of the air inlet unit 200a.

The pre-filter 206 is preferably a carbon filter such as activated carbon mesh in combination with a pollen proof net. The pre-filter 206 and the main filter 203 together may help entrap particulate matter having a size of about 0.3µ or greater.

The controller unit 201 is in fluid communication with the modular heating unit 202; the modular heating unit 202 is in fluid communication with the core module; and the core module is in fluid communication with the modular chamber 205. The modular chamber 205 is in fluid communication with the pre-filter 206, which is in fluid communication with the external ring 207.

A filter check gauge is removably positioned proximate the air inlet unit for providing an indication of air flow volume and thereby, the need to replace either the pre-filter 206 or the filter 203. The modular UV light unit (not shown) may be used to sanitize the air entering the home by treating the air with UV to kill microbial particles that may be present in the air.

In another embodiment, an inlet grille includes a louver assembly including a plurality of blades defining a plurality of convoluted passages. The inlet grille is provided between the carbon filter and the pollen proof net of the pre-filter 206.

A module casing 208, as shown in FIG. 2B, encloses the various parts of the air inlet unit 200a, shown in FIG. 2A, and is designed to protect the parts and serve as an external casing. The length of the modular casing 208 is customizable and designed to fit the standard wall thickness or standard window. For thicker walls, additional rings can be inserted to increase the length of the casing.

It must be understood that the air outlet unit 200b is substantially the same as the air inlet unit 200a.

Figure 2C:
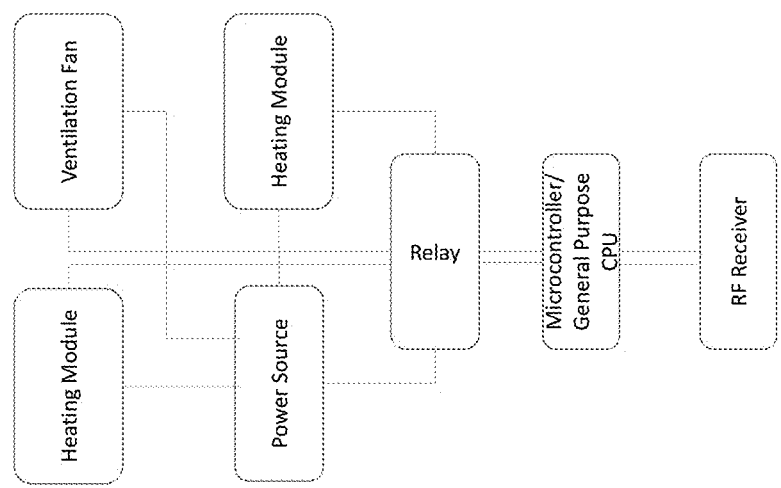
FIGS. 2C-2D illustrate schematic diagrams of operation of an air inlet unit and monitoring unit, respectively, of the air-quality network system in accordance with an embodiment of the inventive concepts.

Referring to FIG. 2C, the air inlet unit 200a, and the air outlet unit 200b each has a microcomputer, microcontroller or microprocessor, a relay, and a wireless receiver unit. The fan 204 and the heating element of the modular heating unit 202 can be powered by batteries, connected to a power outlet using an adapter, or other sources of power.

Figure 2D:
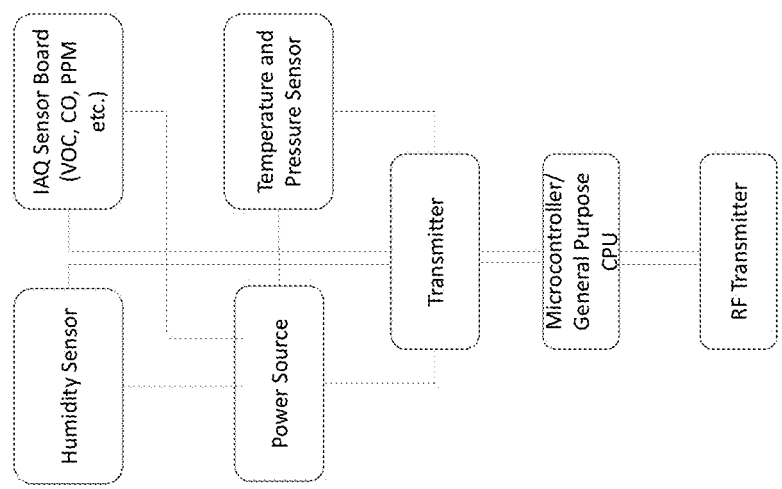

Referring to FIG. 2D, the monitoring unit 600 preferably has a plurality of microcomputers or microprocessors, a plurality of wireless transmitter units, a plurality of sensor boards, and a plurality of sensors to measure atmospheric pressure, temperature, and/or other air quality parameters. The plurality of sensors for measuring particulate matter (PM) and volatile organic compounds (VOC) data may be, for example, Shinyei PPD42NS, Grove MQ5, MQ7, MQ135 and Figaro TGS2600. The monitoring unit 600 may be available in an aesthetically designed box that can be plugged into any standard power outlet for power source or can be powered by batteries, or other sources of power.

In an embodiment of the inventive concepts, as shown in FIG. 3, the monitoring unit 600 may have other add-on modules including, but not limited to, motion sensor unit 600a, Wi-Fi speaker 600b, and LED light 600c. These add-on modules may be used in any combination to constitute the monitoring unit 600.

Figures 4A, 4B:
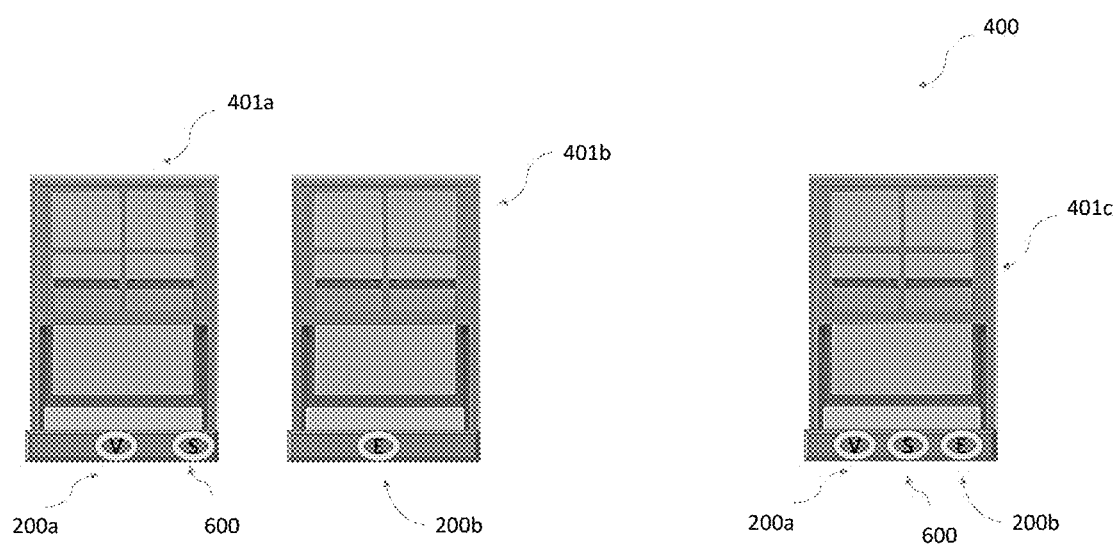
FIGS. 4A-4B illustrate schematic diagrams of air inlet unit, air outlet unit, and monitoring unit of the air-quality network system mounted on windows in accordance with an embodiment of the inventive concepts.

In an embodiment of the inventive concepts, as shown in FIG. 4A, the air inlet unit 200a and air outlet unit 200b are placed within a preferably sturdy and airtight casing designed to fit most of the windows. The air inlet unit 200a may be placed together with the monitoring unit 600 on the window sill of a given window 401a and securely engaged by the weight of the window pane. The air outlet unit 200b may be placed on the window sill of a different window 401b than the window 401a having the air inlet unit 200a, and securely engaged by the weight of the window pane. The bottom and top part of the window unit may be designed with slots/grooves to enable convenient placement of the air inlet unit 200a, the air outlet unit 200b, and/or the monitoring unit 600 within various types of windows such as single and double hung.

In another embodiment of the inventive concepts, as shown in FIG. 4B, the monitoring unit 600 may be placed together with the air inlet unit 200a and air outlet unit 200b within the same window 401c securely engaged by the weight of the window pane.

Figure 5:
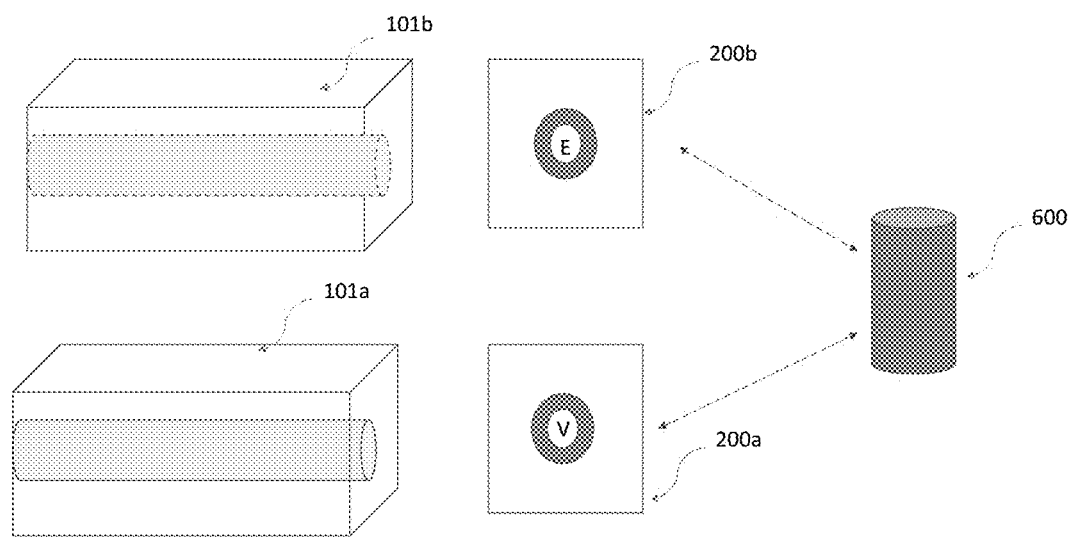
FIG. 5 illustrates a schematic diagram of air inlet and air outlet units of the air-quality network system mounted in a wall in accordance with an embodiment of the inventive concepts.

In an embodiment of the inventive concepts, as shown in FIG. 5, an opening is created in walls 101a, 101b, in a home 101, and the air inlet unit 200a and air outlet unit 200b may be placed inside the walls 101a, 101b. The air inlet unit 200a and air outlet unit 200b can be placed within a sturdy and airtight casing preferably made of insulating material. The wall casing can be rectangular, circular, oval, or any other shapes. The monitoring unit 600 may be placed together with the air inlet unit 200a or may be placed separately as a standalone unit.

Figure 6:
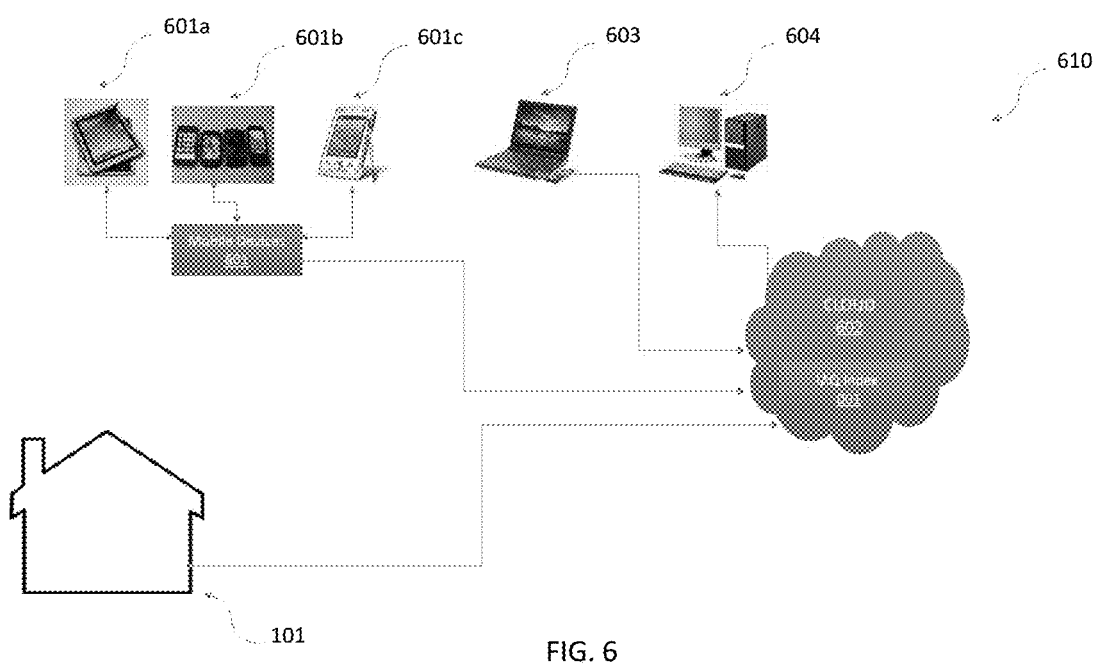
FIG. 6 is a schematic diagram of the air-quality network system in which methods according to various embodiments of the inventive concepts may be implemented.
Figure 7:
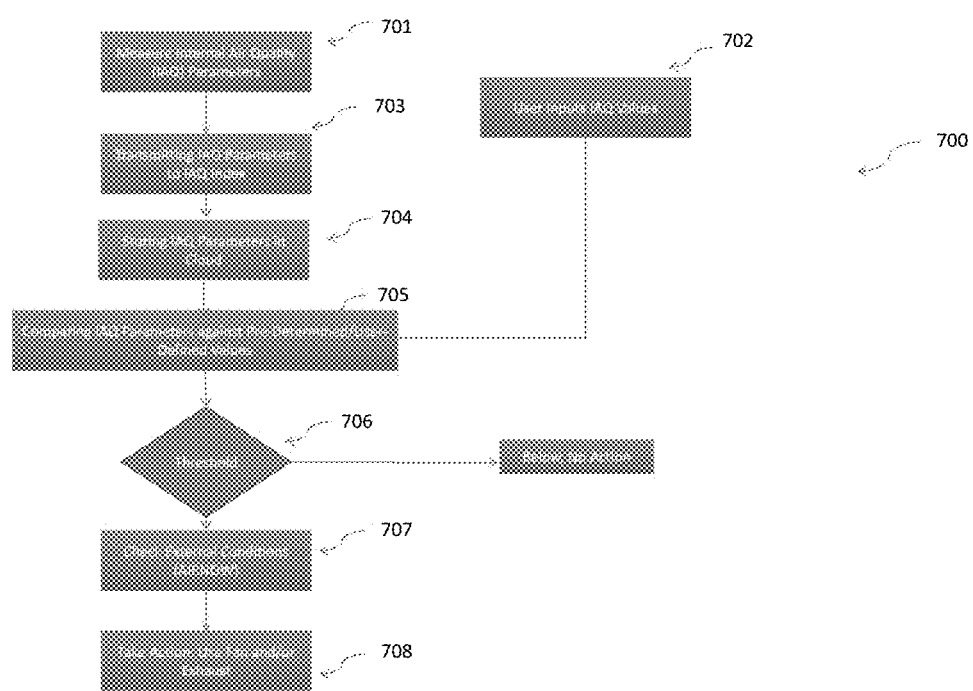
FIG. 7 illustrates a block diagram of a method in accordance with an embodiment of the inventive concepts.

FIG. 6 illustrates a cloud computing architecture 610 in which methods according to various embodiments of the inventive concepts may be implemented. Referring to FIG. 6, mobile devices 601 (such as smartphones 601b, PDAs 601c and tablets 601a), client devices (such as laptop 603, and desktop 604), and other devices (such as touch screen enabled user computing device, multifunction wireless device with software applications, Voice over IP(VoIP) wireless device, or wireless video phone), may be communicatively linked to the cloud 602. The indoor air quality application, IAQ Index 001, may be hosted on the cloud 602. A home 101 having plurality of air inlet units 200a, plurality of air outlet units 200b, and plurality of monitoring units 600 may be communicatively linked to the cloud 602.

The cloud 602 may be a private cloud, community cloud, combined cloud, hybrid cloud, or any other cloud model. The cloud 602 may have services such as Software as a Service (SaaS), which eliminates the need to install and run an application on a client machine; Platform as a Service (PaaS), which facilitates a computing platform in the cloud; and Infrastructure as a Service (IaaS), which delivers computer infrastructure such as servers, storage and network equipment on the cloud. The cloud may be hosted by any of the public cloud services such as Amazon AWS, Microsoft Azure, Google Cloud, IBM Cloud, Oracle Cloud, or the like.

IAQ Index001 is a software application that may be written in a procedural or object-oriented language. In a preferred embodiment, IAQ Index001 is an interactive web application that stores, retrieves, processes, and displays various air-quality parameters including, but not limited to, air quality such as VOC, $CO_2$, CO, PM2.5 and other indoor pollutants; internal and external temperature; internal and external air pressure; internal humidity. The IAQ Index001 incorporates local information relating to external air quality, external temperature and other information from public sources such as AIRNOW, or the like. The IAQ Index 001 also stores operational run-time of the plurality of the air inlet units 200a, the plurality of the air outlet units 200b, and the plurality of the monitoring units 600.

The IAQ Index001 may use various machine learning and modeling strategies to predict changes in indoor air quality by considering the impact of various variables such as humidity, temperature, wind speed, and external pollution level, movement of people, the use of air conditioners and radiators, and the rate at which the air quality returns to its base state when the polluting source is removed. The IAQ Index001 may use machine learning tools, such as Tensorflow, to better predict ventilation response to various air-quality parameters including pollutant concentrations.

The inventive concept further includes providing analytic and interactive visualization capabilities on user devices to aid the user. The user interface may be available on user devices across various platforms such as Android, Apple, Windows or the like. The user interface preferably allows the user to remotely monitor and/or control the air quality by managing the operations of the plurality of the air inlet units 200a, the plurality of the air outlet units 200b, and the plurality of the monitoring units 600. The user interface preferably displays various current detected air-quality parameters, current ON/OFF state, current detected temperature, and current detected humidity. In addition, the user interface provides browsing of data received from the plurality of monitoring devices 600 and provides emergency alert messages regarding high indoor toxicity. The user interface may enable the user to keep electronic records pertaining to history of installation, and filter change and provides 30 days or user specified time period of daily history of air-quality parameters. The user interface has additional capability to provide real-time warning of dangerous operating conditions, through SMS messages and phone calls, which allows the inhabitant or emergency personnel to respond accordingly.

The user interface may have the option to link or not to link the user interface on user devices with the cloud repository. If the user chooses not to link the user interface on user devices with cloud services, the user may choose to use Bluetooth, WIFI or RF module (radio frequency module) for communication between the user device and the monitoring unit 600, air inlet unit 200a, or air outlet unit 200b.

An inventive concept also includes a method 700 of managing the air quality of a home 101 using the air-quality network system 100. The method includes the steps of measuring a plurality of air-quality parameters 701 in the home 101 using a plurality of monitoring units 600; and transmitting the measured values of the air-quality parameters to a remote data management application, IAQ Index 001, hosted on a network, preferably the cloud 602. The IAQ Index001 stores the air-quality parameters 704 in the cloud 602 for permanent storage and archive.

Figure 8:
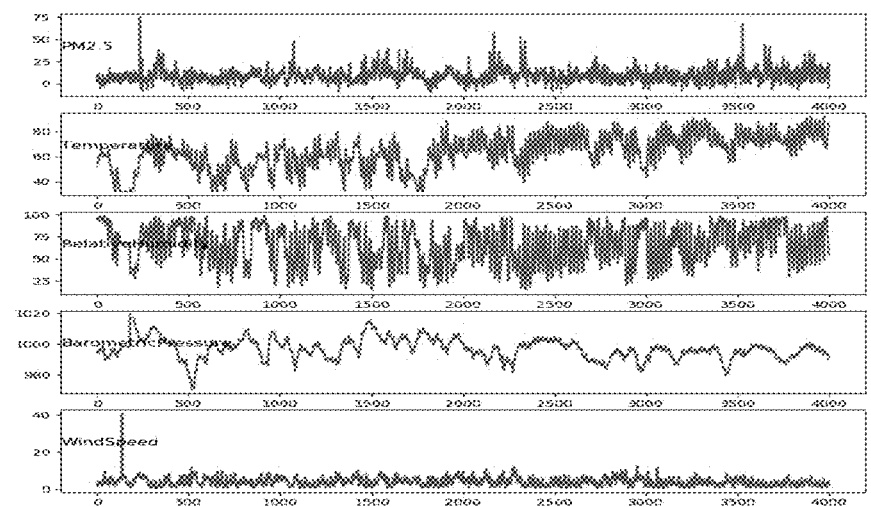
FIG. 8 illustrates a graphical diagram of external air-quality parameters used in implementing a method using the air-quality network system in accordance with an embodiment of the inventive concepts.

IAQ Index001 then compares the measured values of the plurality of air-quality parameters against pre-determined values, moving average, or user-defined values 705. Thresholds 706 are used to compare and determine air quality. For example, user may define acceptable threshold as following: temperature (about 64-78F), humidity (about 25 to 60%), pressure (sea level equivalent), VOC (as mandated by WHO or similar such organization), $CO_2$ (about 250-800 ppm), CO (as mandated by WHO or similar such organization), PM2.5 (about 100-300 ppm). No action is taken if the values are below the threshold. If it exceeds the threshold, the IAQ Index001 checks the external air quality 707, for example, as shown in FIG. 8, using information available on AIRNOW, or the like, and accordingly, determines the response.

The step of determining the response further includes the step of determining the operation of the air inlet unit 200a and/or the air outlet unit 200b for a pre-determined or user-defined period of time, or based on the computer algorithm. Alternatively, the step of determining the operation of the air inlet unit 200a and/or the air outlet unit 200b at a programmable rate that is regulated by the user. Depending on the external air quality, the fan of the air outlet unit

200b or the fan of the air inlet unit 200a is run, for example, T minutes. The "T-minutes" duration is dynamically pre-coded based on the "half-life" estimate. The "half-life" is defined as the time estimated to reduce the concentration of the pollutant by half and is based on modeling pollutant behavior similar to first order decay. The wireless receiver connected to the relay controlling the fan is used to either remove air from the home or to bring in air from outside. In another embodiment, the fans may have variable speeds and the speed of the fans may be increased or decreased to either remove air from the home or to bring in air from outside at a faster rate.

Alternatively, the step of determining the response further includes the step of providing suggestions to the user by displaying one of the following messages: (1) If the external air quality is bad, then to display the message "Do not open windows as opening the windows will reduce the operational time for improving IAQ"; (2) if the external air quality is good compared to the internal air quality, then to display "Open the windows"; or (3) if the air quality has not improved in spite of continuous operation, then to display the message "it is important to remove the source of contamination."

The step of determining the response further includes the step of scheduling an operation time period for the plurality of air inlet units 200a and/or the plurality of air outlet units 200b based on user-specified time period. It further includes the step of providing emergency alert messages regarding high indoor toxicity.

While the inventive concepts described herein with reference to illustrative embodiments for particular applications, it should be understood that the inventive concepts are not limited thereto. Those having ordinary skill in the art and access to the teachings provided herein will recognize additional modifications, applications, embodiments and substitution of equivalents all fall within the scope of the inventive concepts. Accordingly, the inventive concepts are not to be considered as limited by the foregoing description.

What is claimed as new and desired to be protected by Letters Patent of the United States is:

1. A method of managing air-quality in a home using an air-quality network system, comprising:
   measuring values of a plurality of air-quality parameters in said home using a plurality of monitoring units, each of said plurality of monitoring units having a plurality of processors and a plurality of sensors;
   transmitting said measured values of said plurality of air-quality parameters to a remote data management application;
   comparing said measured values of said plurality of air-quality parameters against pre-determined values; and
   determining a response based on pre-determined threshold by checking air-quality conditions external to said home, and determining operation of a plurality of air inlet units and/or a plurality of air outlet units for a period of time,
   wherein the plurality of air inlet units and/or the plurality of air outlet units are part of the air-quality network system which is a modular system,
   wherein each of the plurality of air inlet units of the modular system comprises a controller unit, a modular heating unit, a core module with a fan and a filter, and a modular chamber, and
   wherein the controller unit is in fluid communication with the modular heating unit, the modular heating unit is in fluid communication with the core module, and the core module is in fluid communication with the modular chamber.

2. The method of claim 1, wherein the period of time is a pre-determined or user-defined period of time, or based on a computer algorithm.

3. The method of claim 1, wherein the plurality of air inlet units and/or the plurality of air outlet units is operated at a user-regulated programmable rate.

4. The method of claim 3, further comprising:
   heating incoming air from outside the home to maintain a user-specified temperature inside the home.

5. The method of claim 3, further comprising:
   sanitizing incoming air from outside the home by treating it with UV light.

6. The method of claim 1, wherein the plurality of sensors comprises a volatile organic compound (VOC) sensor, a carbon dioxide sensor, a carbon monoxide sensor, and a humidity sensor, and wherein the plurality of monitoring units further comprises add-on modules having a motion sensor unit, a Wi-Fi Speaker, and an LED light.

7. The method of claim 1, wherein the plurality of sensors includes an indoor sensor and an outdoor sensor.

8. A method of managing air-quality in a home using a cloud-based air-quality network architecture, comprising:
   measuring values of a plurality of air-quality parameters in said home using a plurality of monitoring units, each of said plurality of monitoring units having a plurality of processors and a plurality of sensors;
   transmitting said measured values of said plurality of air-quality parameters to a remote data management application;
   comparing said measured values of said plurality of air-quality parameters against pre-determined values;
   checking air-quality conditions external to said home; and
   determining operation of a plurality of air inlet units and/or a plurality of air outlet units for a stochastic algorithm determined dynamic period of time, the algorithm using half-life estimate to pre-code the period of time,
   wherein the remote data management application is hosted on a cloud communicatively linked to the plurality of monitoring units, and
   wherein the plurality of air inlet units and/or the plurality of air outlet units are part of a modular system for managing air quality in the home,
   wherein each of the plurality of air inlet units of the modular system comprises a controller unit, a modular heating unit, a core module with a fan and a filter, a modular chamber, a pre-filter, an external ring, a modular UV light unit, and a housing unit, and
   wherein the controller unit is in fluid communication with the modular heating unit, the modular heating unit is in fluid communication with the core module, the core module is in fluid communication with the modular chamber, and the modular chamber is in fluid communication with the pre-filter, the pre-filter being in fluid communication with the external ring.

9. The method of claim 8, further comprising the step of: allowing a plurality of users to remotely monitor the air-quality on a plurality of user devices, said plurality of user devices being communicatively linked to the remote data management application hosted on the cloud.

10. The method of claim 9, further comprising the step of: allowing a plurality of users to remotely control the air-quality by managing operations of the plurality of air inlet units, the plurality of air outlet units and the plurality of monitoring units.

11. The method of claim 9, wherein emergency alert messages regarding high indoor toxicity at the home are sent to the plurality of user devices.

12. The method of claim 9, wherein emergency alert messages regarding high indoor toxicity at the home are sent to the plurality of user devices and/or to emergency agencies.

* * * * *